(12) United States Patent
Muthukrishnan et al.

(10) Patent No.: US 6,272,498 B1
(45) Date of Patent: Aug. 7, 2001

(54) METHOD FOR PARTITIONING MULTI-DIMENSIONAL DATA SETS INTO RECTANGULAR PARTITIONS

(75) Inventors: Shanmuugavelayut Muthukrishnan, New York, NY (US); Viswanath Poosala, Highland Park; Torsten Suel, Springfield, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/358,517

(22) Filed: Jul. 22, 1999

(51) Int. Cl.[7] .................................................. G06F 17/30
(52) U.S. Cl. ........................ 707/102; 704/240; 705/35; 707/3; 707/5; 707/100; 707/101; 707/201; 707/501; 707/2; 709/201
(58) Field of Search ..................... 707/2–5, 100–102, 707/200, 201, 501; 345/355, 420; 704/240; 705/35; 709/201

(56) References Cited

U.S. PATENT DOCUMENTS

| | | | |
|---|---|---|---|
| 5,226,109 | * | 7/1993 | Dawson et al. ....................... 345/420 |
| 5,495,539 | * | 2/1996 | Sieverding ............................ 382/276 |
| 5,497,486 | * | 3/1996 | Stolfo et al. ............................ 707/7 |
| 5,546,499 | * | 8/1996 | Lynch et al. ......................... 704/240 |
| 5,551,027 | * | 8/1996 | Choy .................................... 707/201 |
| 5,701,467 | * | 12/1997 | Freeston .............................. 707/100 |
| 5,710,915 | * | 1/1998 | McElhiney .............................. 707/3 |
| 5,781,906 | * | 7/1998 | Aggrawal et al. .................... 707/102 |
| 5,864,857 | * | 1/1999 | Ohata et al. ......................... 707/100 |
| 5,878,409 | * | 3/1999 | Baru et al. ........................... 707/102 |
| 6,003,036 | * | 12/1999 | Martin ................................. 707/102 |
| 6,014,656 | * | 1/2000 | Hallmark et al. ........................ 707/2 |
| 6,122,628 | * | 9/2000 | Castelli et al. ........................... 707/5 |

OTHER PUBLICATIONS

Polo, A. et al., "Multi–dimensional Partitioning for Massively Parallel Database Machines", Proceedings of the 1995 Euromicro Workshop on Parallel and Distributed Processing, Jan. 25–27, 1995, pp. 244–241.*

Wang, Jenny et al., Minimization of Memory Access Overhead for Multidimensional DSP Applications via Multilevel Partitioning, IEEE Transactions On Circuits And Systems–II: Analog and Digital Signal Processing, vol. 44, No. 9, Sep. 1997, pp. 741–753.*

* cited by examiner

*Primary Examiner*—Hosain T. Alam
*Assistant Examiner*—Shahid Alam
(74) *Attorney, Agent, or Firm*—Jean-Marc Zimmerman

(57) ABSTRACT

A method of using an algorithm to partition a multi-dimensional data set into a minimum number of rectangular-shaped partitions that can be processed more quickly than the non-partitioned data set while satisfying certain specified performance constraints.

20 Claims, 2 Drawing Sheets

SALARY IN DOLLARS

|   |   | 10K | 20K | 30K | 40K | 50K | 60K | 70K |
|---|---|---|---|---|---|---|---|---|
| AGE IN YEARS | 20 |  |  | 3 | 1 |  | 5 |  |
|  | 30 |  | 8 |  |  |  |  |  |
|  | 40 |  |  |  | 7 | 9 | 4 | 8 |
|  | 50 |  |  | 6 |  |  | 2 |  |
|  | 60 |  |  |  |  | 5 |  |  |
|  | 70 |  |  |  |  |  |  |  |

SALARY IN DOLLARS

|  | 10K | 20K | 30K | 40K | 50K | 60K | 70K |
|---|---|---|---|---|---|---|---|
| 20 |  |  | 3 | 1 |  | 5 |  |
| 30 |  | 8 |  |  |  |  |  |
| 40 |  |  |  | 7 | 9 | 4 | 8 |
| 50 |  |  | 6 |  |  | 2 |  |
| 60 |  |  |  |  | 5 |  |  |
| 70 |  |  |  |  |  |  |  |

AGE IN YEARS

120
METHOD FOR PARTITIONING MULTI-DIMENSIONAL DATA SETS INTO RECTANGULAR PARTITIONS

FIELD OF THE INVENTION

The present invention pertains to methods for processing data, and more particularly to a method for partitioning a multi-dimensional data set into a plurality of rectangular-shaped partitions which can be processed and stored more efficiently than the non-partitioned data set

BACKGROUND OF THE INVENTION

The speed and efficiency at which a computer having a fixed processing capability accomplishes a delineated task is directly proportional to the quantity of data of being processed. To accomplish tasks more quickly, some conventional processing methods partition a data set in a database into a plurality of smaller data sets which can be processed together more quickly than the non-partitioned data set from which they are derived, thereby increasing the speed at which the data is processed. One widely used method for processing data in this manner is to construct a histogram approximation of a data set comprised of a plurality of numbers by partitioning the data set into a plurality of subsets, i.e., tiles, and then calculating the average value of the numbers in each tile, which average values are used for processing purposes.

The three most widely used types of partitions constructed for two-dimensional data sets are: an arbitrary partition, shown in FIG. 1A, which has no restrictions on the arrangement of tiles; an hierarchical partition, shown in FIG. 1B, in which an array is vertically or horizontally separated into two disjointed tiles which are each further hierarchically partitioned; and a p×p partition, shown in FIG. 1C, in which the rows and columns are each partitioned into disjointed tiles.

A partitioning metric for evaluating the partition is used to construct the histogram, wherein the metric is selected to be less than a fixed performance constraint value δ which varies depending upon the particular task to be performed. An algorithm is then used to determine the partition to be used. Optimal partitioning is obtained by constructing tiles having a minimum variation between the average value of the numbers in the tiles and each of the numbers themselves.

Partitioning of data sets is used for various purposes including, but not limited to, scheduling when a computer will perform various tasks, as well as for selectivity estimation purposes such as determining how many people in a given population data set fall within each one of a plurality of age distributions. For scheduling tasks, δ represents the maximum time within which a task is to be performed, while for selectivity estimation purposes, δ represents the upper limit on the acceptable error of the result The memory available for processing a data set determines the number of partitions into which the data set can be divided, and thus also serves as a limitation on the selected metric.

Conventional methods for partitioning data sets suffer from significant drawbacks. Specifically, such methods partition the data at very slow speeds, even for small data sets, and require large amounts of computer memory to process the data.

SUMMARY OF INVENTION

A method for partitioning a multi-dimensional data set into a minimum number of rectangular-shaped partitions that enable the data to be processed and stored more efficiently than the non-partitioned data set while satisfying certain specified performance constraints, wherein the data set is partitioned using an algorithm.

BRIEF DESCRIPTION OF THE DRAWINGS

FIG. 2 shows a flowchart depicting the steps in the operation of an exemplary embodiment of a partitioning method according to the present invention.

FIG. 3 shows a data set in the form of a two dimensional partition which can be processed using the partitioning method of the present invention.

DETAILED DESCRIPTION OF THE INVENTION

Figure 1A:
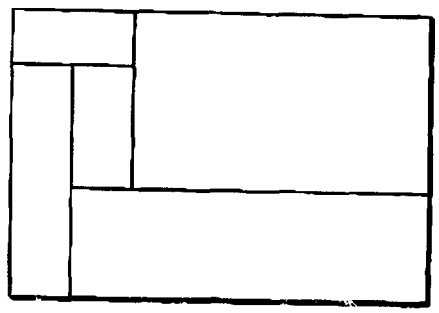
FIG. 1A shows a conventional arbitrary partition.
Figure 1B:
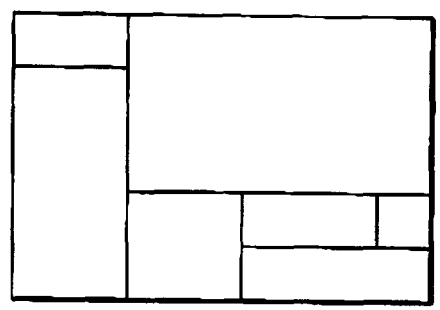
FIG. 1B shows a conventional hierarchical partition.
Figure 1C:
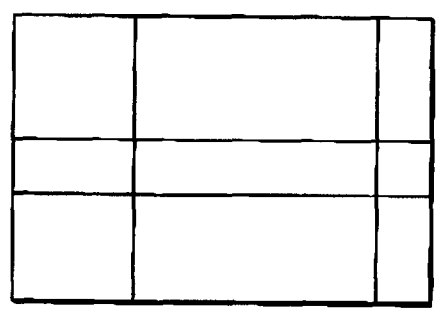
FIG. 1C shows a conventional p×p partition.

The present invention provides a method for partitioning a multi-dimensional data set comprised of a plurality of numbers into a minimum number of rectangular-shaped tiles such that the metric computed on the partition is less than a certain performance constraint δ. This enables the partitioned data to be processed more quickly, using less computer memory than the non-partitioned data set. The present invention can be used for various purposes, including scheduling tasks as well as for selectivity estimation purposes.

The metric used to evaluate the partition constructed according to the present invention is defined in terms of the three following functions: an elementary function calculated on each number in each tile in the partition; a heft function calculated on the results of the elementary functions in each tile in the partition; and a cumulative function calculated on the results of the heft functions for each tile in the partition. The actual composition of these functions depends upon the application in question. For example, for task scheduling problems, the elementary function is each number in each one of the tiles, the heft function is the sum of the elementary functions for each one of the tiles, and the cumulative function is the maximum of the heft functions for the entire partition. For selectivity estimation problems, the elementary function is the square of each number in each one of the tiles, the heft function is the sum of the elementary functions for each one of the tiles, and the cumulative function is the sum of the heft functions for the entire partition.

Given a certain performance constraint δ, the present invention uses an algorithm to determine how to partition the data into a minimum number of tiles that satisfies the limitation that the metric be less than δ. The specific algorithm used for partitioning the data depends upon the specific task for which the data is to be used. For example, as described in greater detail below, a different algorithm is used for determining the p×p partition for scheduling tasks than is used for determining the p×p partition for selectivity estimation purposes.

Irrespective of the task and thus the algorithm used to determine a particular partition, the following terms need to be defined in order to understand the algorithms. X denotes a set of n rows and n columns of an n×n distribution A. For each tile $r_{i,j}$ of a p×p partition H, a corresponding subset $R_{i,j}$ of X is defined consisting of all rows and columns that intersect $r_{i,j}$, except for the last intersecting row and column. A weight function w is used to assign a real-valued weight $w(x)$ to each $x \in X$, and to define a $w(Y)=\Sigma_{y \in Y} w(y)$ for any subset Y of X. In addition, for a given weight function w, a p×p partition is α-good if every tile $r_{i,j}$ of H satisfies $w(R_{i,j}) \leq \alpha \cdot w(X)$.

For a p×p partition in which the data is to be partitioned for scheduling tasks, the cumulative metric used is a MAX metric in which the heft of a partition is the maximum heft of any tiles, and the heft is also monotonic, i.e., does not decrease if its size increases. If a maximum value δ is defined for the heft of the solution, and it is assumed that a $p_0 \times p_0$ partition $H_0$ with heft exists at most δ, then the following algorithm computes a p×p partition with heft at most δ and $p \leq (2+\epsilon) \cdot p_0$, for any chosen $\epsilon > 0$:

(1) The weights of all elements of X are set to 1.
(2) Repeat the following three steps:
   (a) Compute an α-good partitioning H, for $$\alpha = (1/(2+\epsilon)p_o). \quad (1)$$

(b) Find a tile $r_{i,j}$ in H such that $w(R_{i,j}) > \delta$. If none exits, terminate and return H as solution.
   (c) Multiply the weights of all elements of X that are contained in $R_{i,j}$ by $\beta = (1+\epsilon/2)$.

For a p×p partition in which the data is to be partitioned for selectivity estimation purposes, the cumulative metric used is a SUM metric in which the heft of a partition is each comprised of a plurality of numbers each representing the sum of all of the numbers in a different one of the tiles, and the metric is monotonic. If a maximum value $\delta_0$ is defined for the heft of the solution, and it is assumed that a $p_0 \times p_0$ partition $H_0$ with heft exists at most $\delta_0$, then the following algorithm computes a p×p partition with heft at most $2\delta_0$ and $p \leq (4+\epsilon) \cdot p_0$, for any chosen $\epsilon > 0$:

(1) Set the weights of all elements of X to 1.
(2) Repeat the following three steps:
   (a) Compute an α-good partitioning H, for $$\alpha = (1/4+\epsilon)p_o). \quad (2)$$

(b) If the heft of the partitioning is at most $2\delta_0$, terminate and return H as solution. Otherwise, select a tile $r_{i,j}$ at random such that the probability of picking a tile is proportional to its heft
   (c) Multiply the weights of all elements of X that are contained in $r_{i,j}$ by $\beta = (1+\epsilon/2)$.

FIG. 2 shows a flowchart depicting the steps in the operation of the present invention. At step 10, the data comprising the data set is put into an n-dimensional partition. At step 12, a metric is selected. At step 14, a δ is selected. At step 16, an algorithm which provides a partition comprised of a minimum numbers of tiles such that the metric is less than δ is run.

FIG. 3 shows a two dimensional data set which can be processed using the present invention, wherein the vertical column represents a plurality of age ranges in years of individuals in the data set and the horizontal column represents a plurality of salary ranges in tens of thousands of dollars earned by these individuals. The data set is comprised of the numbers of individuals found at the intersection of these two columns.

Although the present invention has been described herein for two-dimensional p×p partitions, it can be used both for n-dimensional partitions, and for partitions other than p×p partitions such as arbitrary and hierarchical partitions. However, p×p partitions provide a more efficient solution than either arbitrary or hierarchical partitions.

Numerous modifications to and alternative embodiments of the present invention will be apparent to those skilled in the art in view of the foregoing description. Accordingly, this description is to be construed as illustrative only and is for the purpose of teaching those skilled in the art the best mode of carry out the invention. Details of the structure may be varied substantially without departing from the spirit of the invention and the exclusive use of all modifications which come within the scope of the amended claims is reserved.

What is claimed is:

1. A method for partitioning a multidimensional data set, comprising the steps of:

selecting a metric for evaluating a partitioning of a data set;

selecting a performance constraint which the metric may not exceed;

constructing an n-dimensional partition from the data set; and running an algorithm to determine the partitioning of the data set, wherein the metric does not exceed the performance constraint thereby ensuring that the data set is partitioned into a minimum number of partitions which enable the data in the data set to be processed more quickly than the data set.

2. The method according to claim 1, wherein the n-dimensional data set is a two dimensional data set.

3. The method according to claim 1, wherein the metric includes an elementary function comprised of each number in the data set.

4. The method according to claim 1, wherein the metric includes a heft function comprised of a plurality of numbers each representing the sum of all of the numbers in a different one of the partitions.

5. The method according to claim 1, wherein the metric includes a cumulative function comprised of a single number representing the maximum value of all of the numbers in all of the partitions.

6. The method according to claim 1, wherein the partition is a p×p partition.

7. The method according to claim 1, wherein the partition is an arbitrary partition.

8. The method according to claim 1, wherein the partition is a hierarchical partition.

9. The method according to claim 1, wherein the data set is used for scheduling at least one task.

10. The method according to claim 9, wherein the performance constraint represents the maximum amount of time it takes to complete the at least one task.

11. The method according to claim 9, wherein the data is partitioned using the following algorithm:

(1) The weights of all elements of X are set to 1;
   (2) Repeat the following three steps:
      (a) Compute an α-good partitioning H, for $$\alpha = (1/(2+\epsilon)p_o),$$

(b) Find a partition $r_{i,j}$ in H such that $w(R_{i,j}) > \delta$. If none exits, terminate and return H as solution;
      (c) Multiply the weights of all elements of X that are contained in $R_{i,j}$ by $\beta = (1+\epsilon/2)$.

12. The method according to claim 1, wherein the data is used for selectivity estimation purposes.

13. The method according to claim 12, wherein the performance constraint represents an upper limit on an acceptable percentage of error in the metric calculated on the partitioning.

14. The method according to claim 12, wherein the data set is partitioned using the following algorithm:

(1) Set the weights of all elements of X to 1;
(2) Repeat the following three steps:
   (a) Compute an α-good partitioning H, for $\alpha=(1/4+\epsilon)p_o$, (b) If the heft of the partitioning is at most $2\delta_0$, terminate and return H as solution. Otherwise, select a partition $r_{i,j}$ at random such that the probability of picking a partition is proportional to its heft;
   (c) Multiply the weights of all elements of X that are contained in $r_{i,j}$ by $\beta=(1+\epsilon/2)$.

15. A method for partitioning a two dimensional data set into a plurality of partitions which can be processed more quickly than the two dimensional data set from which they are derived, comprising the steps of:
   selecting a performance constraint which a metric used to evaluate the partitioning may not exceed;
   constructing an n-dimensional partition from the data set; and
   running an algorithm to determine the partitioning of the data set, wherein the data set is partitioned into a minimum number of partitions, thereby enabling the partitioning to be processed more quickly than the data set from which it is derived.

16. The method according to claim 15, wherein the data set is used for scheduling tasks.

17. The method according to claim 16, wherein the data set is partitioned using the following algorithm:
   (1) Set the weights of all elements of X to 1;
   (2) Repeat the following three steps:
      (a) Compute an α-good partitioning H, for $\alpha=(1/4+\epsilon)p_o$, (b) If the heft of the partitioning is at most $2\delta_0$, terminate and return H as solution. Otherwise, select a partition $r_{i,j}$ at random such that the probability of picking a partition is proportional to its heft;
      (c) Multiply the weights of all elements of X that are contained in $r_{i,j}$ by $\beta=(1+\epsilon/2)$.

18. The method according to claim 15, wherein the data set is used for selectivity estimation purposes.

19. The method according to claim 18, wherein the data set is partitioned using the following algorithm:
   (1) Set the weights of all elements of X to 1;
   (2) Repeat the following three steps:
      (a) Compute an α-good partitioning H, for $\alpha=(1/4+\epsilon)p_o$, (b) If the heft of the partitioning is at most $2\delta_0$, terminate and return H as solution. Otherwise, select a partition $r_{i,j}$ at random such that the probability of picking a partition is proportional to its heft;
      (c) Multiply the weights of all elements of X that are contained in $r_{i,j}$ by $\beta=(1+\epsilon/2)$.

20. A method for determining the minimum number of tiles into which an n-dimensional data set is to be partitioned for processing the data set as quickly as possible, comprising the steps of:
   selecting a performance constraint which a metric used to evaluate a partitioning of a data set may not exceed; and
   running an algorithm to determine the partitioning of the data set, wherein the data set is partitioned into a minimum number of partitions, thereby enabling the partitioned data to be processed more quickly than the data set.

* * * * *